UNITED STATES PATENT OFFICE 2,843,623
Patented July 15, 1958

2,843,623

PRODUCTION OF ETHYL ACETOACETATE

Virgil L. Hansley and Stuart Schott, Cincinnati, Ohio, assignors to National Distillers and Chemical Corporation, a corporation of Virginia No Drawing. Application October 1, 1954
Serial No. 459,833

1 Claim. (Cl. 260—483)

This invention is related to an improved method for the preparation of condensation products from aliphatic esters, and more particularly, to the production of ethyl acetoacetate using dry sodium alkoxides as the condensation agent under superatmospheric pressures.

The commercial preparation of ethyl acetoacetate is carried out by the self-condensation of ethyl acetate in the presence of a condensing agent. In the past, sodium metal and various basic sodium derivatives have been employed as the condensing agents. Generally, yields of only 50–65% have been obtained in large scale operations. Substantial amounts of ethyl acetate are lost as the result of side reactions. Recovery of the remaining unreacted portion of ethyl acetate is difficult and incomplete. Development of continuous and semi-continuous operations has been seriously hampered.

The invention consists generally of carrying out the self-condensation of ethyl acetate to ethyl acetoacetate in the presence of dry, preformed sodium alkoxides such as sodium methoxide and sodium ethoxide as condensing agent in a pressure resistant reactor under controlled conditions. The process involves an initial formation of dry sodium alkoxide, preferably sodium ethoxide. The sodium ethoxide is produced under non-aqueous conditions with no excess of the alcohol remaining after formation of the ethoxide is complete. For example, an approximately equivalent amount of anhydrous ethanol is added to sodium metal either in a separate reactor or directly into the pressure resistant reaction vessel.

One convenient method of operation is to add initially the molten sodium into the reaction vessel and adjust its temperature to about 130° C. Then ethanol vapor is added at such a rate that the temperature does not rise over 150° C. Operating in this manner, the reaction mass rapidly becomes a pulverant powder. This powdery mass is formed even before all of the sodium has been converted. The reactants never pass through a pasty stage. It is important to keep the temperature between 120° and 150° C. At temperatures above 150° C. sodium ethoxide shows thermal instability.

It is necessary to operate above about 120° C. to prevent the formation of coordination compounds between ethanol and sodium ethoxide.

The ethyl acetate reactant is then contacted with the sodium ethoxide, preferably in the same vessel. It is best to contact the dry sodium ethoxide with ethyl acetate which is initially in the temperature range of 35° C. to 78° C. The sodium ethoxide dissolves in the hot ethyl acetate almost immediately. The acetoacetic ester condensation is an equilibrium reaction and proceeds according to the following equation:

$$2CH_3COOC_2H_5 \rightleftharpoons CH_3COCH_2COOC_2H_5 + C_2H_5OH$$

The equilibrium is approximately at 50% conversion when using an amount of base equivalent to the one mole of acetoacetic ester that could theoretically be formed. The reaction may be forced more nearly to completion by using excess ethyl acetate or by removing the by-product alcohol. Excess ethyl acetate in the range of 5 mols for each two condensed will give a yield in the 80–90% range. Less ester is necessary if the reaction is forced by removal of the alcohol. In any case some excess ester is necessary to "slurry" the sodium acetoacetic ester product. As explained below, it is one of the features of this invention to replace some of this excess ester (for slurrying) by less expensive benzene when forcing the reaction under pressure with the continuous removal of alcohol (as the ethanol-benzene azeotrope).

Since some period of time is necessary for the reaction, batch type operations can be carried out by permitting the ethyl acetate to remain in contact with the sodium ethoxide for a period of time sufficient for completion of the condensation.

At the normal atmospheric boiling point of ethyl acetate this period will be between 10 and 20 hrs. The holding period may be substantially reduced by conducting the reaction in a pressure vessel which will permit the reaction temperature to rise to around 100° C. This is believed to render the complex between sodium acetoacetic ester and sodium ethylate unstable so that the base, normally tied up in complex at 78° C., is free to bring about condensation at 100° C. in an unhindered manner. A storage or holding time of at least two to four hours is generally adequate. Prolonged periods of time, however, are unnecessary and may cause slight losses in yield.

One commercially satisfactory method for carrying out the reaction is to condense the ethyl acetate in a pressure fractionating still autoclave at a temperature of around 100° C. to 110° C. under pressure of approximately 20–30 pounds per square inch.

If desired, the alcohol produced as a by-product can be continually removed, to obtain completion of the condensation. One very convenient way for accomplishing this objective is the continuous stripping, under pressure, of the by-product ethanol from the reaction slurry. This is most conveniently and economically done by the distillation from the reaction zone of an azeotrope of the ethyl alcohol with an inert hydrocarbon.

If excess ethyl acetate is present, it can also be removed by distilling out a fraction after the removal of the ethanol or ethanol containing azeotrope.

Various hydrocarbons can be employed in amounts to provide sufficient fluidity to the slurry to permit removal from the reaction vessel and to give azeotropic combinations which are used to remove continuously the ethanol as formed and assist in forcing the condensation to completion. Such inert hydrocarbons as hexane, benzene, and toluene form binary azeotropes with absolute alcohol.

However, complete stripping of by-product ethanol from the reaction mixture is not necessary. Operating continuously, finely divided sodium ethoxide can be introduced in an ethyl acetate slurry with simultaneous removal of crude sodio ethyl acetoacetate from the reaction vessel.

It is necessary to neutralize the sodioacetoacetic ester product by the addition of acid. Although any acidic neutralization agent can be employed, it is preferred to use carbon dioxide either in the solid or gaseous state. Use of carbon dioxide permits a more complete recovery of the pure ethyl acetoacetate, as measured by closer correlation between assay values of contained ester in the crude and isolated product yields. Acetic acid, sulfuric acid, hydrochloric acid, phosphoric acids, and the like can also be used. However, the stronger acids tend to produce hydrolysis reactions with the already formed ethyl acetoacetate and thus reduce isolated yields.

The ethyl acetoacetate product can be separated from the final resulting reaction mixture and further purified by any of the known conventional methods. For example, the carbon dioxide neutralized reaction mixture is added to sufficient water to dissolve the sodium carbonate formed. The ester layer is separated and the aqueous layer extracted twice with fresh ethyl acetate to recover dissolved ethyl acetoacetate. The extracts are then combined with the organic layer and dried over anhydrous potassium carbonate. The excess ethyl acetate is flashed away and the acetoacetic ester distilled under vacuum to separate it from trace amounts of high boiling by-products.

Operating under the preferred conditions of the reaction, contained yields, based on sodium, of ethyl acetoacetate are 88% and higher. Isolated yields of 85% and higher are obtained.

The process can be applied to any of the known aliphatic ester condensations of this general type such as the condensation of two molecules of ethyl acetate, butyl acetate, or amyl acetate, a molecule of ethyl formate and a molecule of ethyl acetate, a molecule of ethyl acetate and a molecule of acetone, and the like.

This process involving the addition of sodium ethoxide as the base has numerous advantages. Operating by this method substantially avoids the formation of by-products and shortens the reaction time, resulting in a considerable economical gain. A further advantage is that the major portion of the rather high heat of reaction is evolved in the separate step of sodium ethoxide preparation where the temperature control is relatively simple. Furthermore, the dangers of handling and circulating mixtures containing unreacted sodium are completely avoided. This process also avoids the hazardous commercial procedure of introducing bricks of sodium into large quantities of hot ethyl acetate.

Operating with dry, powdery sodium ethoxide as condensing agent also avoids difficulties presented by the use of solid forms of sodium in which films build up on the exposed sodium surfaces and isolate the sodium from further contact with the ethyl acetate.

One of the most troublesome side reactions which is encountered during the condensations is the reduction by the metallic sodium of a substantial part of the ethyl acetate to ethanol. This loss of ethyl acetate reactant and by-product contamination can be avoided by the present process in which the condensing agent, sodium ethoxide, is prepared in the dry-way as a separate preliminary step from ethyl alcohol and sodium.

The invention will be described in further detail by the following examples although it is in no way intended to limit the process specifically thereto.

EXAMPLE 1

The sodium ethoxide was prepared by charging an atomic equivalent weight of metallic sodium into the reactor which has been purged with an inert gas. The sodium was then heated to 120–130° C. A molecular proportion of anhydrous ethanol was then gradually introduced into the reactor. The addition rate was controlled such that the reaction temperature did not rise above 150° C. Agitation was maintained continuously throughout the reaction period. Finely divided sodium ethoxide was formed in substantially quantitative yields. By-product hydrogen was allowed to escape.

After all the ethanol reactant was introduced, the alkoxide product was heated at about 130–140° C. for a short period of time and then allowed to cool.

This product was then employed directly to carry out the acetoacetic ester synthesis. It was the preferred procedure to carry out the condensation in a pressure reactor equipped with pressure distillation column equipment. The sodium ethoxide can readily be prepared as described above in such a reactor.

To one molecular equivalent of dry finely divided sodium ethoxide, five equivalents of ethyl acetate were added together with two molecular equivalents of benzene. This amount of benzene is such that there is sufficient to remove, as the benzene-alcohol azeotrope, substantially all the by-product alcohol produced during the condensation reaction. The reaction mixture was heated to 105–110° C. The distillation column was permitted to come to equilibrium after which the benzene-alcohol azeotrope was removed at a reflux ratio of about 50:1. The column overhead temperature during the alcohol removal was 70° C., it arose to 78° C. when all the alcohol was removed.

The reaction product was cooled and converted to ethyl acetoacetate by the addition of carbon dioxide to the reaction mixture. Water was then added and the phases separated. Any residual solvent and unreacted ethyl acetate remaining in the aqueous phase was extracted with fresh ethyl acetate. Crude acetoacetic ester was recovered from the ethyl acetate solution by distillation. The pure fraction recovered distilled at 94° C. at 35 mm. pressure. The yield of acetoacetic ester was about 84% based on the sodium charged.

In continuous operation, additional solvent such as benzene is added into the pressure reaction vessel and the excess ethyl acetate removed for recycling.

The ethanol:benzene azeotrope distills at 60° C. at atmospheric pressure and is composed of 31.8% benzene and 68.2% alcohol. Under the operation pressure of 40–50# the azeotrope distills at a somewhat elevated temperature, around 70° C. After the ethanol is removed, the benzene:ethyl acetate azeotrope distills at about 78° C. The by-product alcohol removed as the benzene azeotrope is anhydrous and can be directly returned to sodium ethoxide step without separation from benzene.

EXAMPLE 2

In a series of experiments, the effect of varying the excess ethyl acetate on the reaction was studied. The results are tabulated in Table I below. One equivalent of preformed, dry sodium ethoxide was used in each experiment with the indicated number of moles of ethyl acetate. Temperature of reaction was 100° C. Toluene was employed as the additional inert hydrocarbon liquid. Carbon dioxide was used for neutralization.

*Table I*

| Expt. No. | Ethyl acetate, moles | Time, min. | Yield | |
|---|---|---|---|---|
| | | | Contained, percent | Isolated, percent |
| 1 | 2.0 | 60 | 46 | 44 |
| 2 | 3.0 | 60 | 65 | 58 |
| 3 | 4.0 | 60 | 74 | 64 |
| 4 | 5.0 | 60 | 78 | 74 |
| 5 | 5.0 | 120 | 80 | 76 |
| 6 | 5.0 | 180 | 81 | 71 |

It is not practical to go below 4 mols of ethyl acetate per equivalent of sodium ethoxide, which leaves only two mols excess over that going to acetoacetic ester. In the old process at least 4–5 mols excess ethyl acetate was necessary to hold the sodium salt of ethyl acetoacetate in slurry form. In this new process this additional ethyl acetate is replaced by the cheaper benzene. Optimum time for condensation reaction, at 100° C., is one to two hours. Shorter time makes for incomplete reaction, longer time, polymeric condensation products.

EXAMPLE 3

Another series of experiments was carried out to study the effect of variation in reaction conditions by conducting the condensation in pressure still equipment to remove ethanol as the benzene azeotrope as rapidly as formed. The data are shown in Table II. One equivalent of preformed dry sodium ethoxide was used with five moles of ethyl acetate and 500 cc. of benzene in each experiment.

Table II

| Exp. No. | Time, min. | Reaction Pot Temp., °C. | Pressure, lbs. | Ethanol, percent of theory | Yield | |
|---|---|---|---|---|---|---|
| | | | | | Cont., percent | Isolated, percent |
| 7 | 210 | 111-122 | 27-32 | 51 | 87 | 84 |
| 8 | 120 | 119-125 | 34-35 | 53 | 84 | 80 |
| 9 | 90 | 119-125 | 35-36 | 81 | 84 | 83 |

Removal of alcohol as formed increases the yield of acetoacetic ester by several percent. It is not necessary to remove all of the by-product alcohol. The less the excess ethyl acetate employed, however, the more complete the by-product alcohol removal must be to obtain a comparable yield.

What is claimed is:

In a process in which ethyl acetate is subjected to self-condensation, the improvement which comprises the steps of continuously reacting sodium with a molecular equivalent of ethanol to form dry-way made finely divided sodium ethoxide, directly and continuously reacting said dry sodium ethoxide with ethyl acetate in the ratio of from 3 to 5 moles of ethyl acetate per mole of sodium ethoxide under pressure of 20-30 p. s. i. in the presence of benzene and at a temperature above 100° C., removing by volatilization under superatmospheric pressure the ethanol substantially as formed as the benzene-ethanol azetrope said azeotrope containing substantially no ethyl acetate, acidifying the resulting reaction mixture with carbon dioxide, and continuously recovering ethyl acetoacetate therefrom.

References Cited in the file of this patent

UNITED STATES PATENTS

| | | |
|---|---|---|
| 1,798,937 | Halbig et al. | Mar. 31, 1931 |
| 1,805,281 | Halbig et al. | May 12, 1931 |
| 2,218,026 | Hansley | Oct. 15, 1940 |

OTHER REFERENCES

B. I. O. S. Final Report No. 1054, Dec. 20, 1946, pp. 9-10.

Chemical Trade Journal and Chemical Engineer, pp. 293-4, Sept. 19, 1947.